Aug. 14, 1951     R. P. CLIFTON     2,564,466
TRANSMISSION MECHANISM
Filed Oct. 24, 1944     3 Sheets-Sheet 1

INVENTOR.
ROBERT P. CLIFTON
BY
Tibbetts + Hart
ATTORNEYS

Aug. 14, 1951     R. P. CLIFTON     2,564,466
TRANSMISSION MECHANISM

Filed Oct. 24, 1944     3 Sheets-Sheet 2

INVENTOR.
ROBERT P. CLIFTON
BY
Tibbetts & Hart
ATTORNEYS

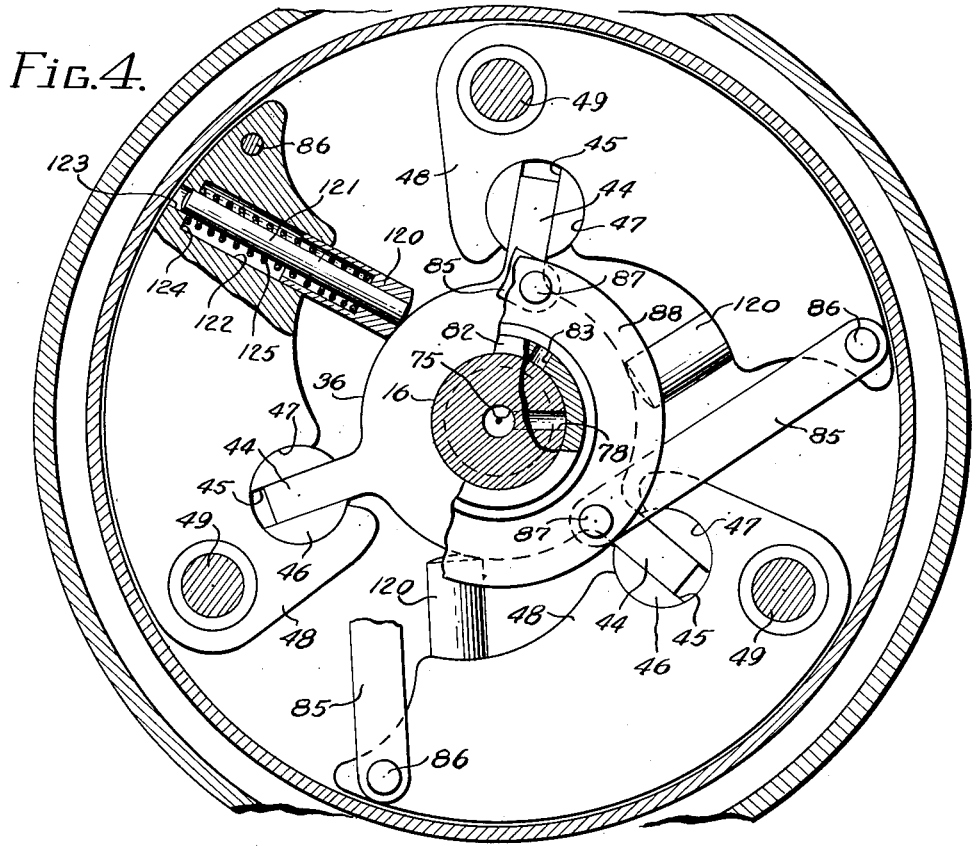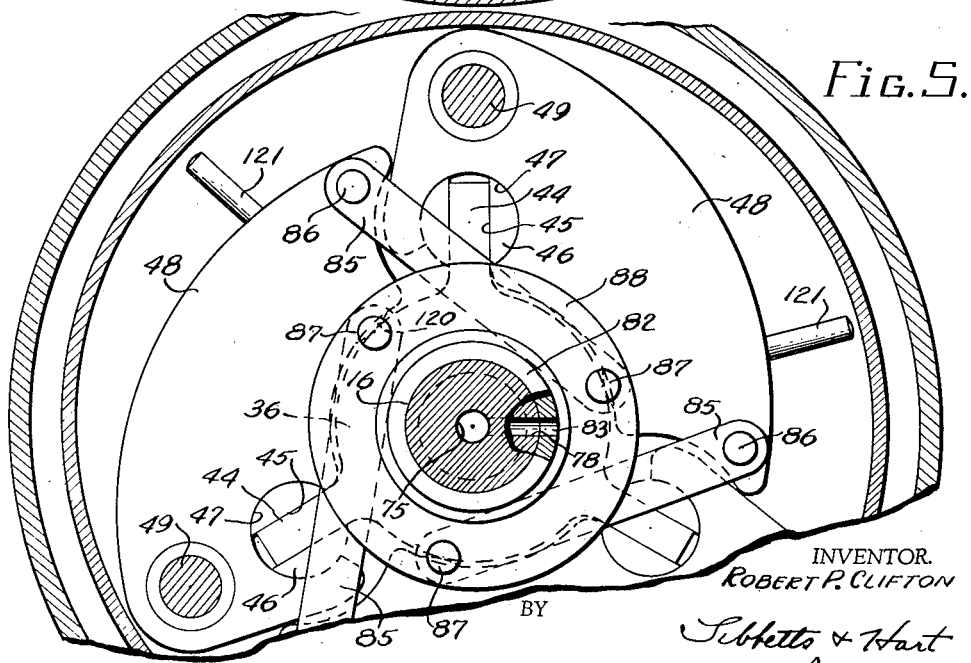

Patented Aug. 14, 1951

2,564,466

UNITED STATES PATENT OFFICE 2,564,466

TRANSMISSION MECHANISM

Robert P. Clifton, Dearborn, Mich., assignor to Packard Motor Car Company, Detroit, Mich., a corporation of Michigan Application October 24, 1944, Serial No. 560,115

9 Claims. (Cl. 74—732)

This invention relates to transmission mechanism and more particularly to control means for change speed gearing.

An object of the invention is to provide a transmission mechanism in which the drive through change speed gearing is controlled by devices actuated hydraulically in response to centrifugal force and engine torque.

Another object of the invention is to reduce creep of a motor vehicle, having a fluid driven change speed mechanism, to a minimum when the vehicle has been stopped in gear with the motor idling.

Another object of the invention is to provide a control for change speed gearing in which the movement of fly-weights for effecting the selection of two driving speeds will be stabilized.

Another object of the invention is to provide a manually operable device for temporarily overruling the effect of an automatic control system for change speed gearing whereby a lower speed drive through the gearing can be obtained at will while the automatic control system is in relation to effect a higher speed drive through the gearing.

Another object of the invention is to provide transmission mechanism in which hydraulic control means for change speed gearing is conditioned for operation by forward and reverse drive control mechanism.

Other objects of the invention will appear from the following description taken in connection with the drawings, which form a part of this specification, and in which:

Fig. 4 is a sectional view of the speed selector device for the transmission mechanism in high speed relation;

Fig. 5 is a view similar to Fig. 4 showing the selector device in a lower speed relation.

Figure 1:
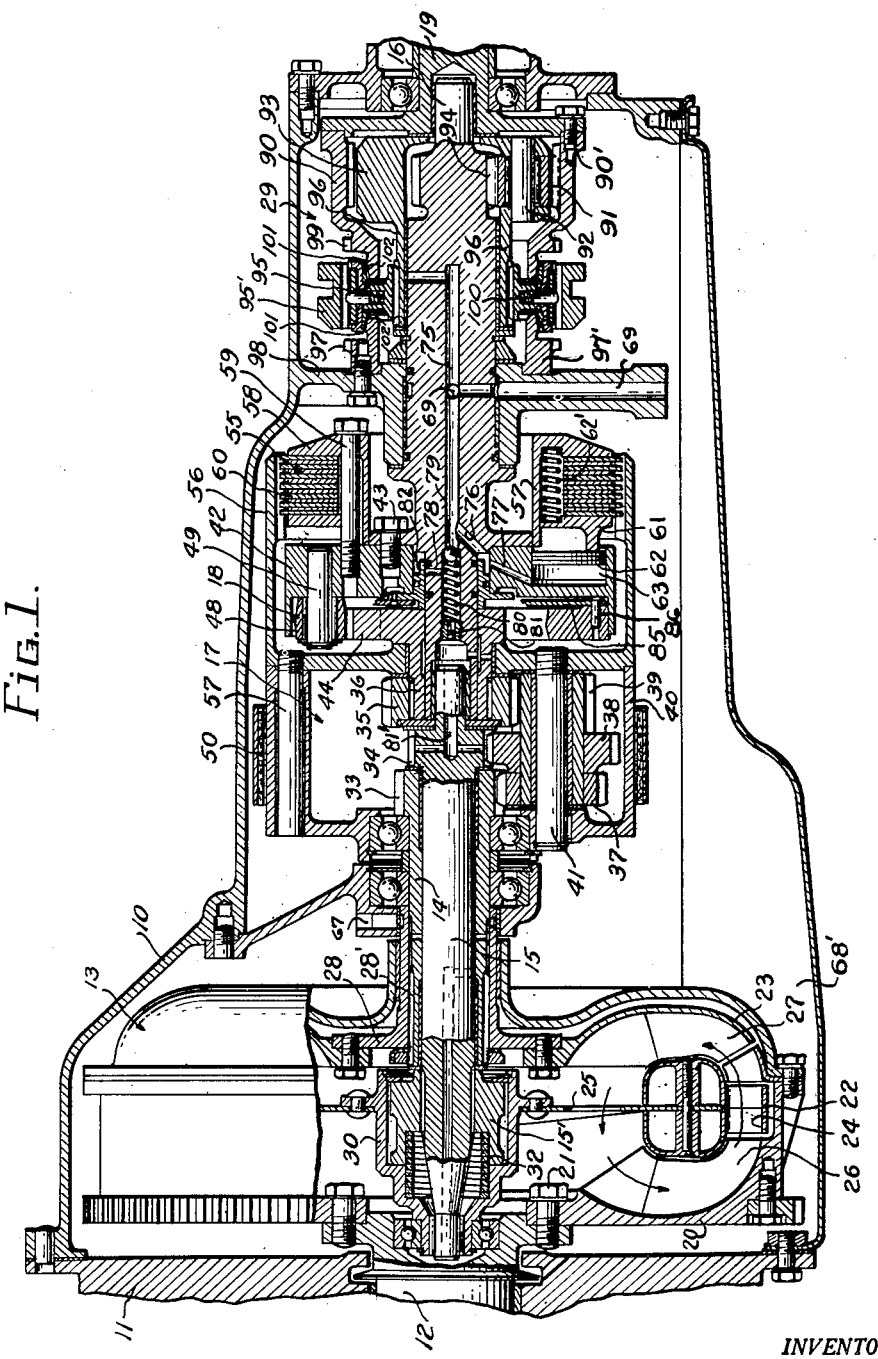
Fig. 1 is a vertical section through a transmission mechanism incorporating the invention.

Transmission mechanism is housed in casing 10 secured to an end of an internal combustion engine 11. The engine crankshaft 12 is connected with a fluid clutch device 13 that transmits power from the engine to drive shafts 14 and 15. Driven shaft 16 aligns with the drive shafts and change speed gearing 17, preferably of the planetary type, is connected to transmit drive from the drive shafts to the driven shaft through means of a connecting device 18. Tail shaft 19 aligns with the driven shaft and mechanism 29 is provided therebetween for selecting forward or reverse drives or neutral. Shaft 16 is piloted at one end in the adjacent end of tail shaft 19 and the other end of shaft 16 serves as a pilot for the adjacent end of shaft 15. This transmission mechanism is especially adapted for driving automobiles.

The fluid clutch device, the change speed gearing and the drive shaft arrangement may be of the type shown and described in Duffield Patent No. 2,373,234, granted April 10, 1945. The clutch device comprises an impeller section 20 fixed to the crankshaft 12 by bolts 21, a first runner 22 and a second runner 23, the runners being concentric with the impeller and are designed and arranged so that fluid will flow therethrough in series. Runner 22 has an outer ring 24 and an inner disk with openings 25, ring 24 registering with the outer ends of passages 26 of the impeller and passages 27 of the second runner while openings 25 register with the inner ends of passages 26 and 27. Runner 23 is fixed to hub 28 splined at 28' on sleeve drive shaft 14 and hub 30 fixed to runner 22 is adapted to drive ring 15' splined to shaft 15 through means of an overrunning spiral spring clutch 32.

The change speed gearing includes drive gear 33 formed or fixed on sleeve shaft 14, drive gear 34 formed or fixed on shaft 15, driven gear 35 splined on spider 36 rotatably mounted on shaft 16, and planet gear spool units each having a gear 37 meshing with gear 33, a gear 38 meshing with gear 34 and a gear 39 meshing with gear 35. The gearing also includes carrier 40 on which journal pins 41, extending through the spool units, are fixed. These spool gears are rotatably mounted on pins 41 and the gears of each unit may be formed separate and fixed together or formed as an integral structure.

The device 18 connects the spider 36 with an extension ring 42 fixed to the driven shaft 16 by bolts 43. Legs 44 project from the spider and are slidably mounted in slots 45 in pins 46. These pins are rotatably mounted in recesses 47 formed in weights 48, the recesses and pins extending parallel with the axis of the spider. The weights are pivotally mounted at one end on pins 49 fixed to ring member 42. Thus the drive from the spider, fixed to driven gear 35, is through arms 44, pins 46, weights 48 and pins 49 to the ring member 42 fixed to the driven shaft. The free ends of the weights move outwardly in response to centrifugal force and engine torque force acts on the spider to move the free ends of the weights inwardly and these opposed forces act to induce and control the pivotal movement of the weights.

Rotation of the carrier of the planetary gearing is controlled by a brake device in the form of a friction brake band 50. This band encircles the carrier and one end is suitably anchored at 50' to casing 10, see Fig. 2. The other end of the band has an actuator 51 attached thereto in the form of a rod fixed to piston 52 operative in housing 53. Spring 54 in this housing exerts pressure against the piston and rod to normally engage the brake band on the carrier and pressure means is provided to move the piston in a direction disengaging the brake band from the carrier.

The planetary gearing is also controlled by a device in the form of a lockup clutch 55. The carrier of the planetary gearing has an extension shell 56 telescoping the spider, the end of the driven shaft and the connecting device therebetween, such shell being splined interiorly to form the outer housing of the clutch. The inner housing of the clutch is in the form of a sleeve 57 having a backing flange 58 and secured to the driven shaft extension ring 42 by bolts 59. Clutch plates 60 are arranged between the two housings and are alternately splined to each in the usual manner. The clutch device includes actuator means consisting of a pressure ring 61, piston 62 and springs 62'. The springs are seated against the backing flange 58 and engage pressure ring 61 to normally disengage the clutch plates and the piston 62 is arranged in a chamber 63 formed in the ring extension 42 of the driven shaft. When the piston is moved to engage the clutch plates, the carrier will be locked to the driven shaft and the planetary gearing will then be locked up so that it will drive as a solid unit, and direct drive is thereby effected.

The control means for the planetary gearing is such that the brake device and the clutch device are alternately engaged and disengaged, that is, one is engaged while the other is disengaged, and vice versa. The gear ratio of the sets of gearing in the planetary gearing is such that gears 33 and 37 will provide an intermediate speed drive when effective and gears 34 and 38 will provide a low speed drive when effective.

The impeller 20 forces fluid through runners 22 and 23 in series so that when starting up, or when the load is light, runner 22 will be the driver and will rotate shaft 15 and gear 34 through the overrunning clutch 32 to make the low speed gearing effective. As the liquid force in the fluid clutch increases, runner 23 will become the driver and the drive will be through shaft 14 to make the intermediate speed gearing 33, 37 effective, this drive carrying shaft 15 therewith, through the unitary relation of the planet gears so that shaft 15 will overrun the runner 22. When either gear 33 or 34 is effective as the driver the tendency is to drive the carrier in reverse so by engaging brake device 50, the carrier is held stationary and the planet units will revolve on pins 49. Rotation of either planet gears 37 or 38, whichever is effective, will carry gears 39 therewith to thus rotate driven gear 35 and a spider 36 from which the drive is transferred to the driven shaft through the connecting device 18. When the brake device is applied for low and intermediate driving speeds through the planetary gearing, the lock device 55 will be disengaged. When the planetary gearing is locked up by engagement of the clutch device 55, the brake device will be disengaged from the carrier and the drive will be direct from the fluid clutch.

Control means is provided for the brake and lock devices that includes a fluid pressure system which may be part of the pressure lubricating system for the transmission mechanism and/or a part of the fluid supply system for the fluid clutch. A dual pump device 65 has a drive gear 65' driven by suitable means, such as the engine, and pump gears 66' and 67' meshing with the drive gear. Each pump is connected by a conduit 66 with the sump 68' of the casing. One pump outlet conduit 67 leads to the fluid clutch to maintain a uniform quantity of fluid therein and another fluid outlet conduit 68 connects with passage 69 in casing wall 98 communicating with housing 53 and with chamber 63. Valve housing 70 is interposed in conduit 69 where valve means is operative to control the fluid flow to the brake and lock devices. There is a bypass passage 71 in this valve housing connected with the main passage 72 and a valve member 73 is provided to control fluid flow through such passages. An annular groove 74 in the valve member will permit oil flow through the housing when registered with either of passages 71 or 72.

Passage 69 communicates with passage 75 extending axially in the driven shaft and a branch passage 76 connects with passage 77 in the shaft extension ring 42 that opens to chamber 63. There is a relief passage 78 in the shaft 16 connecting chamber 63 with passage 75 and a one-way ball valve 79 is arranged in passage 75 intermediate the inlet and outlet passages for chamber 63. This valve is normally seated by coil spring 80 arranged in passage 75 which bears against an outlet metering plug 81 screwed in the drive shaft. Oil flow through the outlet relief passage 78 is controlled by a sleeve relief valve 82 mounted for oscillation between driven shaft 16 and ring extension 42. Oil flowing through plug 81 will pass through a passage 81' having radially extending terminals open to the interior of the casing. This sleeve relief valve has an orifice 83 that may be registered with passage 78 when it is desired to reduce the fluid pressure in chamber 63 so that springs 62' can disengage clutch 55. This relief valve must be in open position whenever the brake means is engaged for first and second speed drives and in closed position to cause engagement of clutch 55 for direct drive. When the sleeve relief valve is open oil will by-pass through passages 76, 83 and 78 so that pressure will be insufficient in chamber 63 to bias springs 62' and under such condition the oil pressure in conduit 69 will be insufficient to overcome the pressure of spring 54 engaging the brake band on the carrier. Thus, when the relief valve 82 is in open position, with respect to passage 78, the planetary carrier will be held stationary and the drive will be either first or second speed as induced by the fluid clutch to meet the driving conditions encountered. When the sleeve relief valve is moved to close passage 78, pressure will build up in chamber 63 sufficiently to overcome the pressure of springs 62' and engage clutch 55, and pressure will also build up in conduit 69 and housing 53 to move piston 52 in a direction disengaging the brake band from the planetary carrier. Spring 80 exerts sufficient pressure against valve 79 to seat the same until an abnormal pressure is built up in passage 75, either when valve 82 is closed or when some unusual oil pressure develops beyond that normally expected.

The means for controlling oil pressure in chamber 63 and housing 53, that is, the sleeve relief valve, may be actuated automatically by the driving connection 18 between the planetary gearing and the driven shaft and is actuated in response to movement of the weights 48 as dictated by the torque and centrifugal forces acting thereon in opposite directions. Links 85 are pivoted at 86 to the free ends of the pivoted weights 48 and at 87 to flange 88 on the sleeve valve 82. Thus the sleeve valve is oscillated by the weights in their pivotal movement so that when centrifugal force overcomes engine torque to a predetermined extent the sleeve valve will be shifted to close relief passage 78 as indicated in Fig. 4, otherwise the sleeve valve will open the relief passage 78 as shown in Fig. 5. As previously related, closure of the relief passage 78 will build up fluid pressure to engage clutch 55 and disengage brake 50 thereby effecting direct drive through the planetary gearing and when relief valve 82 opens passage 78 the fluid pressure is insufficient to engage the clutch 55 and to disengage brake 50, thereby conditioning the planetary gearing for first or second speed drive. When conduit 69 is closed to flow through housing 70, the oil pressure to housing 53 will build up sufficiently to disengage brake 50 so the carrier is free to rotate and, as a result, the planetary gearing will idle and no power will pass therethrough.

Mechanism 29 for selecting forward or reverse drive and neutral is provided between driven shaft 16 and tail shaft 19. An internal ring gear 90 is fixed to the tail shaft by bolts 90' and meshes with planet gears 91 mounted on pins 92 fixed to carrier 93 rotatably mounted on the driven shaft. The planet gears mesh with sun gear 94 fixed on the driven shaft 16. A selector clutch consisting of an inner ring 95 is splined on an extension 96 of the carrier and an outer ring 95' has splines engaging splines on the inner ring. The outer ring is shiftable axially to engage teeth 97 on an abutment 97' fixed to wall 98 of casing 10 or external teeth 99 on the ring gear 90. A spring controlled driving connection 100 normally causes these rings to move together in an axial direction. Clutch ring 95 has conical synchronizing brake rings 101 adapted to engage complementary conical surfaces 102 on the abutment and the ring gear 90 prior to engagement of the outer clutch ring with teeth 97 or 99 so that the rotation of the clutch elements to be engaged is synchronized prior to engagement. The clutch ring 95' is shifted axially by a yoke 103 fixed on shaft 104 which is pivotally mounted on casing 10. This yoke may be manually actuated by a flexible cable 105 having a knob 106 at the instrument board 107 of the automobile. The three positions of the control knob and the yoke as adjusted by the cable is shown by legends in Fig. 3.

Figure 2:
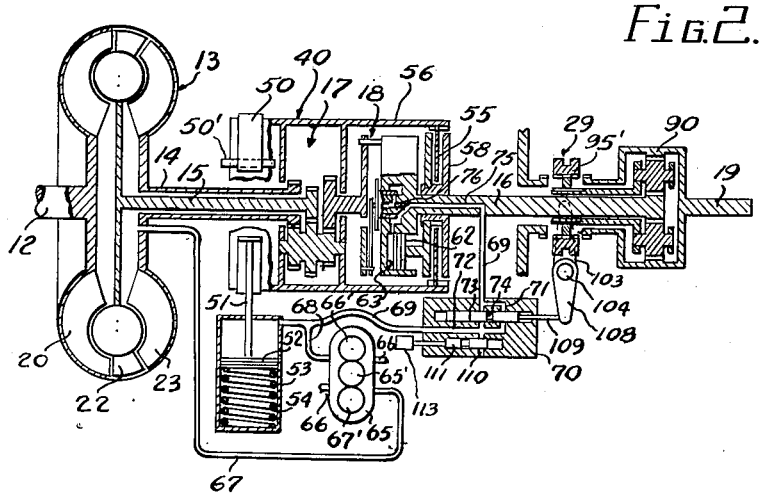
Fig. 2 is a diagrammatic sectional view of the transmission mechanism and the control therefor.

Movement of the clutch yoke may be utilized to control valve 73. An arm 108 is fixed on the yoke shaft 104 and this arm is connected to valve 73 by link 109. When the selector mechanism is in neutral position as shown in Fig. 2, the valve 73 will shut off fluid flow to the planetary lock means so that clutch 55 is disengaged and the brake means will be disengaged by fluid pressure in housing 53. At the same time there will be no driving connection through the selector mechanism between the driven shaft 16 and tail shaft 19.

Figure 3:
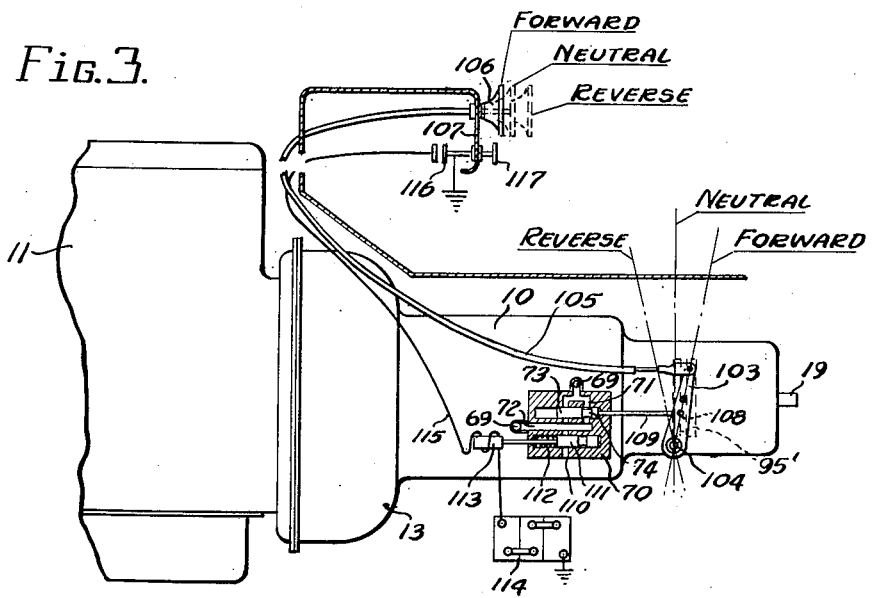
Fig. 3 is a side elevational view of the power unit.

When the yoke 103 is shifted to the right, or rearwardly, as shown in full lines in Fig. 3, valve 73 will open the by-pass passage 71 so there will be fluid flow to both the brake device and the clutch device 55 and the carrier and ring gear in the selector mechanism will be locked so there will be forward direct drive from shaft 16 to shaft 19. Under this condition the drive may shift automatically between high speed and a lower speed through the change speed gearing as dictated by the position of the relief valve.

When the yoke is shifted to the left, as shown in dotted lines in Fig. 3 for reverse drive, it will move the valve 73 to permit fluid flow through passage 72 to clutch chamber 63 and oil will also flow to the brake means housing 53. Thus the planetary gearing can drive in low, or intermediate speeds as dictated by pressure in the fluid coupling, or between high speed and a lower speed as dictated by the relief valve just the same as in forward drive. The clutch in the selector mechanism will now be locked to casing 10 holding carrier 93 stationary and thereby causing planet gears to rotate on stationary axes and drive the tail shaft in a reverse direction from that in which the driven shaft is rotating. There may be three reverse driving speeds.

There are occasions when the planetary gearing is conditioned for high speed and a lower speed is desired. This may be accomplished through a further control of the fluid pressure system. The valve housing 70 may be provided with a relief passage 110 communicating with passage 72, in advance of valve 73, through which oil flow is controlled by valve 111. This valve is normally maintained in passage closing position by spring 112, see Fig. 3, and is moved to open position by the energizing of solenoid 113 which has an armature fixed to the stem of the valve. The solenoid is under the control of an electric circuit having a battery 114, conductor 115 and a grounded switch member 116 actuated manually by a knob 117 at the instrument panel 107. When valve 111 is closed, the control for the planetary gearing will be as previously described. When valve 111 is in open position, fluid will flow from the housing 70 through passage 110 so that pressure in the clutch chamber 63 and in the brake control housing 53 is relieved. Even though the sleeve relief valve 82 is in high speed position, pressure relief through passage 110 will cause disengagement of clutch 55 and pressure relief in the brake control housing will cause the brake device to be engaged so that the planetary gearing will now drive in first or second speed as dictated by the fluid clutch. Thus a shaft can be made from high speed to second speed or first speed drive through the planetary gearing when the automatic control dictates high speed drive. Thus when it is desired to shift down from high to second speed to better utilize the engine as a brake for the vehicle, as when going downhill, pushing knob 117 forwardly will energize the solenoid circuit and shift valve 111 to a position relieving the fluid pressure control system through passage 110.

With the mechanism so far described torque will take entire control of the weights 48 when the engine is idling and the vehicle is standing still or moving very slowly with the result that the weights will be in their inward position where they will open the relief sleeve valve to effect first or second speed drive when the selector clutch is engaged for forward or reverse drive. There is some fluid drag in the fluid clutch causing a greater torque multiplication through the first and second speed driving relation of the planetary gearing than through the planetary gearing when conditioned for high speed drive. In order to reduce vehicle creep of the vehicle caused by torque multiplication when the selector clutch is engaged and the engine is idling, at a stop light for example, provision is made to automatically shift from the normal first and second speed drive relation of the planetary gearing to high speed driving relation. Cylindrical members 120 bear on the flange of the spider 36 between the arms 44 and have stems 121 fixed thereto. The members 120 extend into recesses 122 in the free ends of the weights 48 and the stems project into openings 123 in the peripheral portions of the weights. Springs 125 are seated in recesses 122 with one of their ends bearing against the abutments 124 and the other of their ends bearing against members 120. These springs provide a sufficient force to shift the weights outwardly to shift valve 82 closed and establish high speed drive through the change speed gearing when the engine is idling and the selector clutch is engaged for forward or reverse drive. This is desirable as torque multiplication of fluid drag will be minimum when in high gear. Movement of members 120 is retarded by air, the recesses 122 thus providing a dash pot effect that will oppose sudden inward or outward movement of the weights. Thus the weight position will be automatically shifted under the circumstances mentioned and sudden movement of the weights in either direction at any time will be damped.

It will be understood that various forms of the invention other than that described above may be used without departing from the spirit or scope of the invention.

What is claimed is:

1. In a transmission mechanism having an output shaft, planetary gearing connected to the output shaft and a carrier, control means comprising a brake for holding the carrier to effect one driving speed, clutch means shiftable to lock the planetary gearing for unitary rotation to effect another driving speed, spring means normally operative to engage the brake, spring means normally operative to disengage the clutch means, a fluid pressure system connected to engage the clutch means and to disengage the brake, a pressure relief valve for fluid in the clutch means, and torque-speed responsive means connected to open or close said valve, the pressure of the fluid in the system being insufficient to disengage the brake or engage the clutch means when the relief valve is open and sufficient to engage the clutch means and disengage the brake when the valve is closed.

2. In a transmission mechanism having a two speed gearing and a clutch shiftable to select forward or reverse drives and neutral, means for shifting said clutch, control means comprising two devices alternately effective on the gearing to establish different driving speeds, a fluid pressure system effective to control the application and release of said devices, means responsive to actuation of said clutch shifting means for shutting off the fluid pressure system when the clutch is in neutral position and opening the system to the devices when the clutch is in either forward or reverse drive establishing position.

3. In a transmission mechanism having a two speed gearing and a clutch shiftable to establish drive or neutral, control means comprising two devices selectively effective on the gearing to establish different driving speeds, a fluid pressure system for controlling application and release of said devices on the gearing, valve means operable to close the fluid system connection with one of the devices or to open the system to both devices, and an actuator for the valve means connected to the clutch, the valve means being closed when the clutch is in neutral and opened when the clutch is in drive relation.

4. In an engine driven transmission having a two speed gearing and a clutch shiftable to establish drive or neutral, control means comprising a pair of devices selectively effective on the gearing to establish two driving speeds, a fluid pressure system connected to control the effect of the devices on the gearing, a valve operable to open or shut the system to one of the devices, means responsive to torque-speed for controlling the fluid pressure effect on the devices when the valve is open, and a connection between said clutch and the valve whereby the valve is open when the clutch is in drive relation and closed when the clutch is in neutral relation.

5. In a transmission mechanism having planetary gearing and a carrier, control means comprising a brake for holding the carrier to effect one driving speed, a clutch for locking the gearing to effect unitary rotation thereof at another driving speed, spring means operating to engage the brake, spring means operating to disengage the clutch, a fluid system under pressure connected to bias said spring means, a pressure relief valve for the clutch, means responsive to a predetermined speed of the gearing to close the relief valve whereby the clutch will be engaged and the brake disengaged by fluid pressure, and a valve in the system operable at will while the pressure relief valve is closed to relieve pressure in the system to effect disengagement of the clutch and engagement of the brake.

6. In an engine driven transmission mechanism having planetary gearing therein and a carrier, of control means comprising a brake for holding the carrier to provide a low speed drive, a clutch for locking the gearing for unitary rotation to provide a high speed drive, springs means acting to engage the brake, spring means acting to disengage the clutch, a fluid pressure system connected to bias the springs, a relief valve for the fluid system connected with the clutch, torque-speed responsive means effective to shift the relief valve to open or closed position, the fluid pressure being insufficient to bias the brake engaging spring until the relief valve is closed to engage the clutch, and valve means operable to relieve pressure in the system to effect release of the clutch and engagement of the brake while the relief valve is closed.

7. In an engine drive transmission mechanism, a drive shaft, a driven shaft, planetary change speed gearing driven by the drive shaft and having a carrier telescoping one end of the driven shaft and forming a clutch housing, said housing having a fluid-conducting passage, a torque-speed device connected to drive the driven shaft from a driven planetary gear, said device including weights movable outwardly in response to centrifugal force and inwardly in response to torque, a normally disengaged clutch in the housing, a fluid pressure system including the passage in the housing, a rotatably adjustable valve controlling fluid flow from the housing, and links connecting the weights in operating relation with the valve.

8. In an engine driven transmission, a fluid operated drive shaft, a driven shaft, change speed gearing driven by the drive shaft and having two speed ratios, a device connecting the change speed gearing with the driven shaft having pivoted weights, means operable to effect the high speed ratio of the gearing in response to outward movement of the weights by centrifugal force, the weights being acted upon by engine torque to move inwardly, and means exerting sufficient outward pressure against the weights to move them into position to effect high speed ratio of the gearing when the engine is idling and there is no load, torque shifting the weights inwardly as soon as the engine is accelerated.

9. In an engine driven transmission, an engine driven fluid clutch, a drive shaft rotated by the clutch, a driven shaft, planetary gearing driven by the drive shaft including a carrier and a driven gear, a device drivingly connecting the driven gear with the driven shaft, brake means for the carrier to effect low speed drive through the planetary gearing, means for locking the planetary gearing to rotate as a unit and effect high speed drive, a fluid pressure system connected to engage the lock means and to disengage the brake means, spring means for engaging the brake means, spring means for disengaging the lock means, relief valve for the fluid system at the lock means, the fluid pressure acting to disengage the brake means being insufficient to bias the brake means engaging spring while the relief valve is open but sufficient to disengage the brake means when the relief valve is closed when the pressure engages the lock means, pivoted weights on the device for actuating the relief valve, said weights being moved outward by centrifugal force to close the relief valve and such movement being opposed by engine torque, and means acting on the weights with sufficient force to overcome the effect of torque when the engine is idling and there is no load to effect closing of the valve to engage the lock means and put the gearing in high speed ratio where the fluid drag is multiplied to a lesser extent than when the gearing is in the lower speed ratio.

ROBERT P. CLIFTON.

REFERENCES CITED

The following references are of record in the file of this patent:

UNITED STATES PATENTS

| Number | Name | Date |
|---|---|---|
| 963,092 | Sundh | July 5, 1910 |
| 1,609,782 | Small et al. | Dec. 7, 1926 |
| 2,021,550 | Haycock et al. | Nov. 19, 1935 |
| 2,221,393 | Carnegie | Nov. 12, 1940 |
| 2,229,336 | Neracher | Jan. 21, 1941 |
| 2,260,406 | Roche | Oct. 28, 1941 |
| 2,343,955 | Cotterman | Mar. 14, 1944 |
| 2,376,545 | Livermore | May 22, 1945 |